United States Patent [19]
Lindley et al.

[11] 3,934,153
[45] Jan. 20, 1976

[54] ELECTRO-OPTIC SYSTEM WITH EXPANDED POWER RANGE

[75] Inventors: John P. Lindley, Redwood City; James Rieden, San Jose, both of Calif.

[73] Assignee: Itek Corporation, Lexington, Mass.

[22] Filed: Jan. 10, 1975

[21] Appl. No.: 540,288

[52] U.S. Cl............. 250/578; 250/216; 250/237 R; 356/74
[51] Int. Cl.²......................................... H01J 39/12
[58] Field of Search............ 356/74, 76, 77, 96, 98; 250/216, 550, 553, 578, 237 R

[56] References Cited
UNITED STATES PATENTS

| | | | |
|---|---|---|---|
| 2,807,799 | 9/1957 | Rosenthal | 356/74 X |
| 3,193,687 | 7/1965 | Hatcher | 250/216 |
| 3,612,691 | 10/1971 | Schwartz | 356/74 |
| 3,700,910 | 10/1972 | Smith | 250/216 X |
| 3,702,735 | 11/1972 | Potter, Jr. | 356/74 X |
| 3,829,218 | 8/1974 | Alyanak | 356/98 X |

*Primary Examiner*—Walter Stolwein
*Attorney, Agent, or Firm*—Homer O. Blair; Robert L. Nathans; Gerald H. Glanzman

[57] ABSTRACT

A Bragg cell spectrum analyzer in which the output of the Bragg cell is detected by a unique electro-optic system which allows the selection of any desired dynamic power detection range. As is known in the art, the output of a Bragg cell consists of a radiation spot or spots along a line in which the position of each spot along the line is related to the frequency of a component of the input signal to the Bragg cell, and the intensity of radiation of each spot is proportional to the strength of the component causing that spot. In the disclosed embodiment the output of the Bragg cell is directed upon a cylindrical lens system which expands each spot into a line of radiation. This results in a two dimensional pattern of lines with the position of each line being the same as the position of the radiation spot causing the line, and the intensity of radiation in each line being proportional to the intensity of radiation in the spot causing that line. The two dimensional pattern of radiation, consisting of spaced lines of radiation, is directed through a stepped density filter onto a two dimensional photodiode array. The photodiode array is utilized to detect the position of each line, which indicates the frequency of the input component causing that line, and is utilized to detect the number of photodiodes reaching saturation along the line, which indicates the strength of the component.

7 Claims, 1 Drawing Figure

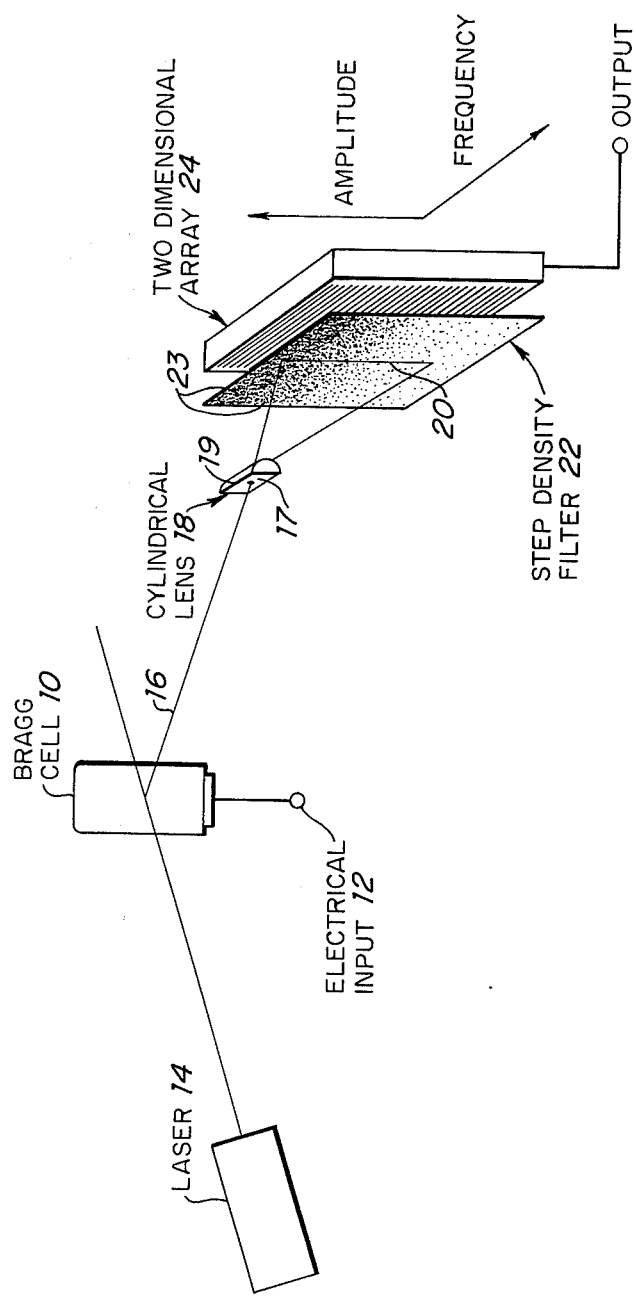

ELECTRO-OPTIC SYSTEM WITH EXPANDED POWER RANGE

BACKGROUND OF THE INVENTION

The dynamic power range of many electro-optic systems is limited by the characteristics of current photodetector arrays. For example, in the disclosed embodiment wherein the electro-optic system is a Bragg cell spectrum analyzer, the dynamic range of the Bragg cell is over 50 dB, but the dynamic range of the photodiode array is limited to a 20 to 25 dB range in light power, primarily because of residual noise in the switching circuits which access the photodiode array. The limitations on dynamic power range are further complicated by the square law characteristics of the detectors which result in the requirement of an output electronic dynamic range of 50 dB to handle a 25 dB range of input light power. Because of this requirement, an electro-optic system designed to fully utilize the 50 dB dynamic power range capability of a Bragg cell with a single photodetector array would require an output electronic dynamic power range of 100 dB, which, if at all possible, would be extremely difficult.

SUMMARY OF THE INVENTION

In accordance with a preferred embodiment, a system is disclosed for measuring the intensity of radiation. The radiation is formed into a line and directed against a stepped density filter which varies the intensity of the radiation along the line to allow a substantial portion of the radiation in the line to pass at one segment along the line and to allow less and less radiation to pass at other segments along the line. The stepped density filter has a predetermined function from segment to segment such that the variation in intensity of the radiation caused by the stepped density filter assumes that same predetermined function. A linear array of photodetectors is positioned to detect radiation passed by the stepped density filter. The intensity of the radiation is determined by detecting the number of detectors in the linear array which receive radiation above a given threshold level.

Further, in accordance with one disclosed embodiment of the invention a system is disclosed for measuring the distribution and intensity of a two-dimensional radiation pattern formed at the output of a spectrum analyzer. The spectrum analyzer has an acousto-optic modulator which receives an acoustic input signal. The output of the spectrum analyzer is a line of radiation with the position of radiation along the line being related to frequency components of the acoustic signal and the strength of radiation along the line being related to the strength of the components of the acoustic input signal. The line of radiation is then directed against a cylindrical lens system to form the two dimensional pattern of radiation which has radiation signals spaced along an X axis, and each radiation signal has a component extending along a Y axis. The two dimensional pattern of radiation is then directed against a stepped density filter which varies the intensity of the radiation along the Y axis such that a substantial portion of the radiation is passed at one segment along the Y axis and less and less radiation is passed at other segments along the Y axis. The radiation passed by the stepped density filter is directed to a two dimension photodetector. The photodetector detects the position of signals along the X axis and also detects the amount of radiation along the Y axis, which indicates the intensity of the radiation.

BRIEF DESCRIPTION OF THE DRAWING

The FIGURE illustrates a schematic representation of one embodiment of the present invention.

DESCRIPTION OF A PREFERRED EMBODIMENT

Referring to the FIGURE, there is illustrated a Bragg cell spectrum analyzer system. The spectrum analyzer includes a Bragg cell 10 having an acoustical input 12 and a radiation input from a laser 14. As is known with this type of system, an electrical input signal at 12 excites an acoustical transducer on the Bragg cell to cause acoustical waves to be formed across the cell. The acoustical waves cause the radiation beam traveling through the cell to be diffracted to form an output radiation beam 16 which is illustrated in the FIGURE as one beam but which may actually consist of an angular array of beams. As is known regarding Bragg cells, the acoustical waves cause part of the laser beam traveling through the cell to deflect, with the intensity of the deflected beam being proportional to the strength of the acoustical wave and the angle of deflection being proportional to the frequency of the acoustical wave. If the acoustical wave has multiple components at different frequencies the output of the Bragg cell will consist of multiple spots of light with the position of each light spot being related to the frequency of each component and the intensity of each light spot being proportional to the strength of each component.

With the current state of the art of Bragg cells, the dynamic range of a typical Bragg cell is over 50 dB, but the photodiode dynamic range is limited to a 20 to 25 dB range in light power, primarily because of residual noise introduced by the switching circuit which accesses the photodiode array. The limitations on dynamic power range are further complicated by the square law characteristics of the diode detectors. Each diode produces an output voltage proportional to its input light power, and since the power out of each diode is $V^2/R$ the electrical power output of each diode is proportional to the square of its input light power. Because of that characteristic an output electronic dynamic range of 50 dB is required to handle a 25 dB light power input range. To build a system with the capability of fully utilizing the 50 dB dynamic range of the Bragg cell with a single photodiode array would require an output electronic dynamic range of 100 dB, which, if possible, would be extremely difficult.

The output 16 of the Bragg cell 10 is normally detected by a photodetector array, which may consist of a linear array of photodiodes such as a linear array of 500 diodes as is available from Reticon Corp. The linear array of photodiodes produces an output signal which indicates the angular components of the output beam 16 and also the strengths of each of the components.

The FIGURE illustrates a system for extending the dynamic power detection range of the output of a Bragg cell spectrum analyzer to any desired power range. In the FIGURE, the output of the Bragg cell, which normally consists of a spot or spots of radiation along a line 17, is directed upon the flat face of a cylindrical lens system 18. In the FIGURE the Bragg cell output is illustrated as one radiation spot 19 which the cylindrical lens system forms into a radiation line 20. The radiation line is formed on a stepped density filter 22 which has density steps 23 formed on it perpendicular to the direction of the radiation line 20. The filter transmits radiation through it in accordance with the density steps to a two dimensional array 24 of photodetectors. In the preferred embodiment the two dimensional array of photodetectors may be an array such as a 50 × 50 photodiode array available from Reticon Corporation.

In accordance with this arrangement the detector array has the frequency information from the Bragg cell available along one axis and the amplitude information from the Bragg cell available along the other axis, as shown in the FIGURE. Now, consider a signal on one column of detectors perpendicular to the frequency axis. If the signal is large the detectors with the minimum density steps in front of them will be saturated. Higher on the column the density filter will reduce the signal to within the linear range of the detectors, and higher on the column the signal will be reduced below a minimum detectable value. If the detector output were scanned in a raster to produce a two dimensional image, the picture would be vertical lines in which the frequency information is related to the horizontal position of each line and the signal strength information is related to the height of each line. The picture would be fully white at the bottom where the detectors are saturated and fade to black at the top where the signal is below the detection level.

The step density filter 22 may be made by a variety of methods, and may have any arbitrary density function. This is an important feature of this invention, and is applicable in general to many electro-optic systems. The output of the photodiode array may be selected to be any arbitrary function of the input by selection of that same arbitrary function for the filter, which is a very valuable feature in the design of many electrooptic systems. Also, this feature may be utilized in embodiments of electro-optic systems forming just one line from one spot, and thereby requiring only a linear array of photodetectors.

In the preferred embodiment, a logarithmic variation in the step density filter may be utilized. If the input light intensity is $I_0$ the light on the nth detector in a column may be represented as
$$I_n = \alpha_n I_c$$
where $\alpha_n$ is the density of the filter at row $n$ and $$\alpha_n = \frac{1}{10^{An}}$$

where A is the density change per detector. For example, if A is 0.1 then each detector has 1-dB less power than the previous detector.

If the detector array is scanned column by column and a threshold detector is used to count the number of photodetectors above a fixed threshold, then the number is proportional to the signal strength in dB's and can be used as the input to a digital system.

If the photodetector array has a well-defined saturation characteristic an analog output may easily be obtained by summing the charge stored in any column. The output charge $Q_{out}$ is $$Q_{out} = \sum_{n}^{k} = 1 Q_n$$

where $Q_n$ is the charge in the nth detector and k is the total number of detectors in the array.

While several embodiments have been described, the teachings of this invention will suggest many other embodiments to those skilled in the art. Although the preferred embodiment illustrates a transmissive density filter, in some embodiments a reflective density filter might be utilized.

We claim:

1. A system for measuring the intensity of radiation and comprising:
   a. means for forming the radiation into a line of radiation the intensity of which may be measured;
   b. a density filter means, having said line of radiation directed thereon, for varying the intensity of the radiation along the line to allow a substantial portion of the radiation in the line to pass at one segment along the line and to allow less and less radiation to pass at other segments along the line, said density filter means having a predetermined function from segment to segment such that the variation in intensity caused by said density filter means assumes said predetermined function;
   c. a linear array of photodetectors positioned to detect said line of radiation passed by said density filter means such that individual detectors within the array detect particular segments of the radiation line; and
   d. means for determining the intensity of the radiation and including means for determining the number of detectors in said linear array which detect radiation above a given threshold level, whereby the number of radiation detectors detecting radiation above the given threshold level is indicative of the intensity of the detected radiation.

2. A system as set forth in claim 1 wherein said linear array of photodetectors includes a linear array of photodiodes.

3. A system as set forth in claim 1 wherein said means for determining the number of detectors in said linear array which detect radiation above a given threshold value includes means for determining the number of detectors in said linear array which are saturated by their radiation input.

4. A system for measuring the distribution and intensity of a two dimensional radiation pattern having radiation signals spaced along an X axis and each radiation signal having a component extending along a Y axis substantially perpendicular to said X axis, and comprising:
   a. two dimensional photodetector means for detecting radiation along both said X and Y axes;
   b. means for directing said two dimensional pattern of radiation onto said two dimensional photodetector means, said radiation pattern having radiation signals spaced along said X axis and each radiation signal having a component extending along a Y axis substantially perpendicular to said X axis; and
   c. a density filter means, positioned in the radiation path between said means for directing radiation and said two dimensional photodetector means, for varying the intensity of radiation along said Y axis such that the density filter means allows a substantial portion of the radiation to pass at one segment along the Y axis and allows less and less radiation to pass at other segments along the Y axis, whereby the output of the photodetector means defines the position of all signals along said X axis, and the amount of radiation detected along said Y axis by said photodetector means indicates the intensity of the detected radiation.

5. A system as set forth in claim 4 wherein said means for directing said two dimensional pattern of radiation onto said two dimensional photodetector means includes:
   a. means for producing a radiation pattern along a line; and
   b. a cylindrical lens means, having said radiation pattern along a line incident thereon, for forming a two dimensional pattern of radiation from said radiation pattern along a line.

6. A system as set forth in claim 5 wherein said means for producing a radiation pattern along a line includes a spectrum analyzer means having an acousto-optic modulator which receives an acoustic input signal, said spectrum analyzer means producing an output radiation pattern along a line with the position of radiation along the line being related to the frequency of components of said acoustic input signal and the strength of radiation along the line being related to the strength of components of said acoustic input signal.

7. A system as set forth in claim 6 wherein said two dimensional photodetector means includes a two dimensional array of photodiodes.

* * * * *